April 19, 1938.   B. T. BROOKS   2,114,463
ART OF PRODUCING ALCOHOLS FROM OLEFINES
Filed Jan. 2, 1930
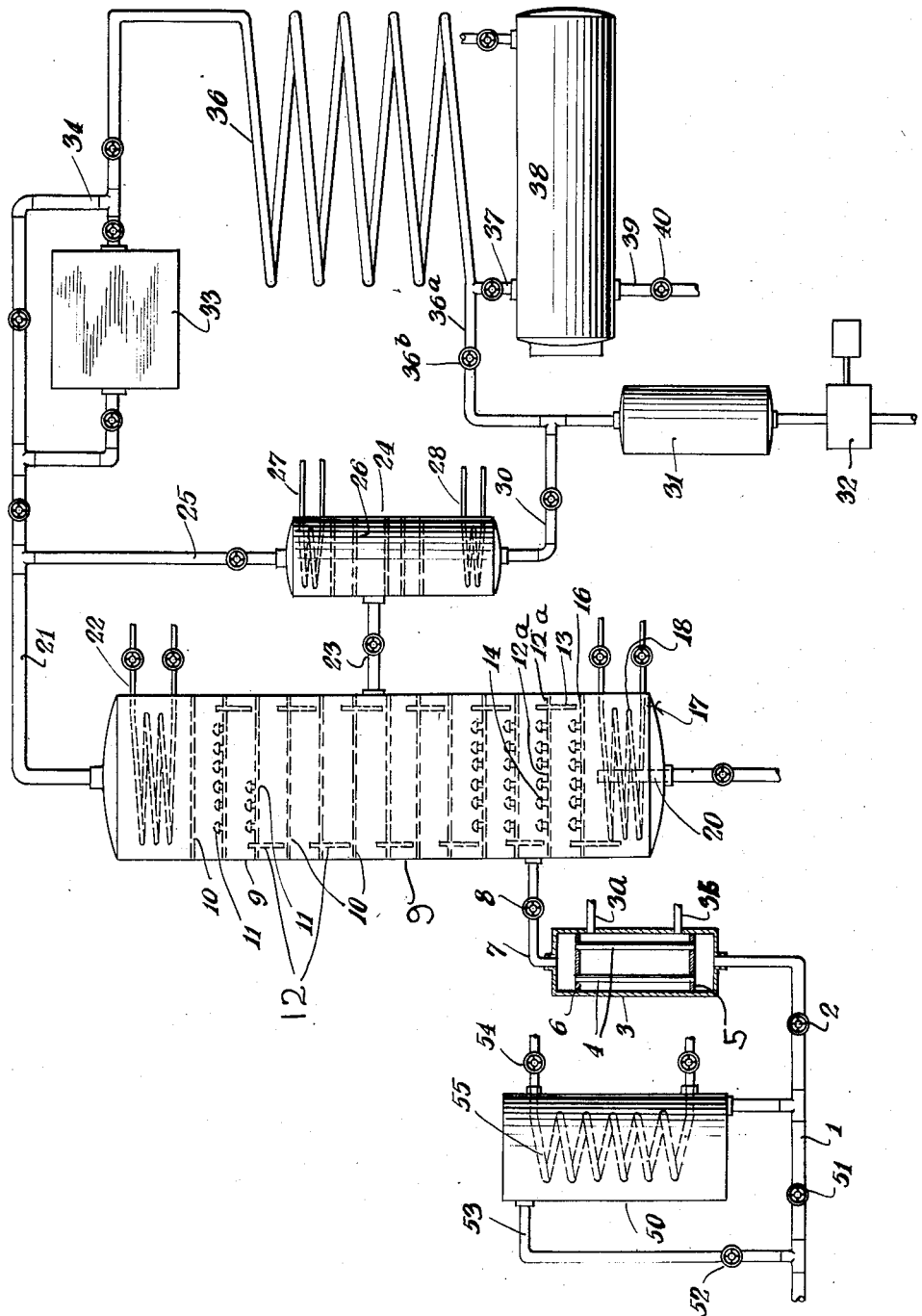

Patented Apr. 19, 1938

2,114,463

UNITED STATES PATENT OFFICE 2,114,463

ART OF PRODUCING ALCOHOLS FROM OLEFINES

Benjamin T. Brooks, Stamford, Conn., assignor, by mesne assignments, to Standard Alcohol Company, Wilmington, Del., a corporation of Delaware Application January 2, 1930; Serial No. 417,993

12 Claims. (Cl. 260—156)

In the course of generating tertiary butyl alcohol by the sulphation of isobutene an acid liquor is produced containing H₂O, H₂SO₄, and organic material consisting preponderantly of isobutene. The extent to which the isobutene is present as tertiary butyl sulphate or tertiary butyl alcohol is a function of temperature, dilution, etc.; and for that reason such acid liquors will be hereinafter generically referred to as a liquid phase containing as equilibrium components $H_2O$, $H_2SO_4$, and organic material consisting preponderantly of isobutene, regardless of the state of combination of the components enumerated.

In one method of manufacturing tertiary butyl alcohol from cracked petroleum material an olefine fraction or cut is made consisting predominantly of olefines containing four atoms to the molecule. Such a fraction may, for example contain approximately the following percentages of the constituents enumerated:

| | Percent |
|---|---|
| Erythrene | 15–20 |
| Isobutene | 15–30 |
| Normal butene | 45–65 |

An acid liquor of the type hereinabove referred to may be prepared by treating such an olefine fraction with aqueous sulphuric acid from 60 to 70%, $H_2SO_4$ content, at temperatures generally below 70° F. A preferred method for making an acid liquor of the type described consists in treating such an olefine fraction with sulphuric acid between 60 and 65%, $H_2SO_4$ content, preferably at temperatures between 55 and 65° F. Such acid liquors have heretofore been converted into tertiary butyl alcohol by dilution, neutralization, and distillation from the neutralized solution. With this concentration of acid and at this temperature the normal butenes are not converted into alcohols.

I have found that by appropriate manipulation, tertiary butyl alcohol in satisfactory yields may be obtained directly from such acid liquors. I have found, for example, that by maintaining a ratio of at least one part of $H_2O$ by weight for every part of $H_2SO_4$ present in such an acid liquor and partially distilling the same, I can produce a vapor phase containing tertiary butyl alcohol. The extent to which the acid liquor is partially distilled is sufficient to separate therefrom the organic material present together with some water, while leaving aqueous sulphuric acid in the undistilled material. In a batch distillation the temperature of the liquor is gradually raised until practically all of the organic material has been recovered leaving a residue of aqueous sulphuric acid.

Tertiary butyl alcohol may be separated from the vapor phase so produced in any suitable way, for example, the vapor phase may be completely condensed and then redistilled to separate it into its components and to produce therefrom a constant boiling point tertiary butyl alcohol, water mixture. I have further found that the proportion of tertiary butyl alcohol produced by this procedure may be very substantially increased by conducting the distillation under vacuum, pressures between zero and ten pounds absolute being preferred for this purpose. During the distillation conducted as above described, some di-isobutene may be produced and will be found in the vapor phase produced by partial distillation of the said acid liquor, although the proportion of di-isobutene produced is substantially minimized by the application of vacuum.

In my preferred procedure however, I maintain in said acid liquor at least 65 parts of $H_2O$ by weight for every 35 parts of $H_2SO_4$ present, and I find that in this way I am able to substantially eliminate the production of di-isobutene producing almost entirely tertiary butyl alcohol and a small proportion of isobutene. The isobutene and tertiary butyl alcohol produced in vapor phase by partially distilling as aforesaid, may be separated in any suitable manner, as for example, by partially condensing tertiary butyl alcohol therefrom while permitting the uncondensed isobutene to continue on to a suitable gasometer.

In this case again, I find that I can substantially increase the amount of tertiary butyl alcohol formed by conducting the distillation under vacuum, an absolute pressure of zero to ten pounds absolute being preferred. In each case the isobutene recovered may also be converted to tertiary butyl alcohol, thereby further augmenting the yield of tertiary butyl alcohol.

My preferred procedure will be explained by reference to the drawing which is a diagrammatic elevation with parts in section through a form of apparatus in which my process may be carried into effect. Referring to the drawing, the acid liquor preliminarily diluted in order to maintain a ratio of $H_2O$ to $H_2SO_4$ within the limits previously defined, is introduced through pipe 1, controlled by valve 2, to preheater 3. A heating medium is supplied to the preheater through pipe 3ᵃ, and after circulating exteriorly of the tubes is conducted away through pipe 3ᵇ. The diluted acid mixture is heated in this exchanger by passing through the tube bank 4 held between header plates 5 and 6, and is then discharged through pipe 7, controlled by valve 8, into column 9.

The function of the preheater 3 is to bring the acid liquor to the temperature of the liquid in the column at the point at which the acid liquor passes into the column, thereby facilitating the smooth and efficient operation of the column. The column 9 is equipped with liquid vapor contact devices such as plates 10, provided with bell caps 11 and overflow pipes 12, so that liquid and vapor may flow countercurrently with respect to one another in the column, the liquor flowing in a general downwardly direction, while the vapor in its upward course is dispersed successively by means of bell caps 11 through the pool of liquid maintained on each plate. The preheated acid liquor enters column 9 and commingles with the pool of liquid of substantially constant volume which is retained on plate 12ª by means of overflow pipe 13. The liquid on plate 12ª consisting principally of aqueous sulphuric acid is maintained in constant distillation by means of steam dispersed therein from bell caps 14. The plates 12ª, and 16, together with the base 17 of the column, constitute a stripping section. Steam or other heating means is continuously introduced through coil 18 to maintain distillation in the pool of liquid held in the lower part of the column by overflow pipe 20, and the vapors evolved therefrom maintain continuous distillation conditions on plates 12ª, and 16.

Conditions in the column are preferably so adjusted that practically all the organic material in the acid liquor introduced is evolved on plate 12ª. The temperature of the pool of liquid on plate 12ª will correspond generally to the temperature of a liquid in a batch distillation under corresponding pressure at which substantially all of the organic material has been evolved from the liquid phase. The vapor phase containing tertiary butyl alcohol evolved from the pool of liquid on plate 12ª passes upward through the column. This vapor phase may be fractionated in that part of the column above pipe 7 and the upper part of the column above plate 12ª constitutes a rectifying section. When so operating the column with the vapor phase consisting principally of tertiary butyl alcohol a small proportion of isobutene is produced and may be taken off overhead through pipe 21. Reflux may be supplied to the column by operation of cooling coil 22, which must be supplied with a refrigerant capable of condensing isobutene such as liquid $SO_2$ or liquid ammonia, in order to provide the necessary reflux. A side cut of constant boiling point tertiary butyl alcohol and water may be taken off through pipe 23 discharging into auxiliary column 24. Any isobutene in this side cut may be stripped therefrom in column 24 and passes upwardly through vapor outlet 25, discharging into pipe 21.

Column 24 is provided with liquid vapor contacting devices such as plates 26, carrying bell caps and overflow pipes not shown, and column 24 may be further provided with a cooling coil 27 adjacent the upper part thereof, and a heater coil 28 adjacent the lower part thereof. The stripped constant boiling point mixture of tertiary butyl alcohol passes through pipe 30 into receiver 31 from which it may be diverted by means of pump 32 to point of storage or utilization. While I have described one system for rectifying the vapor, it will be apparent that various other systems may be equivalently employed, for example, and particularly where the proportion of isobutene is low, all of the alcohol may be taken overhead through pipe 21, conducted directly into condenser 36, and after condensation in 36 diverted through pipe 36ª, controlled by valve 36ᵇ, into receiving tank 31.

The system just described is preferably operated under a pressure varying from zero to ten pounds absolute, and this may be accomplished by means of a vacuum pump diagrammatically indicated by 33. This vacuum pump may be of any suitable type including either a mechanical pump or a jet ejector, or both, and preferably raises the isobutene passing therefrom through discharge outlet 34 to a pressure sufficient to liquefy the same in passage through cooling coil 36 which may be cooled in any suitable manner, for example, by the use of cooling water.

The liquefied isobutene passes through pipe 37, into storage tank 38, from which it may be withdrawn when desired through pipe 39, controlled by valve 40. As previously stated, this isobutene is preferably converted to tertiary butyl alcohol, thereby augmenting the total recovery from the acid liquor processed.

The foregoing specific description is for purposes of illustration and not by way of limitation. While I have recited a method of distilling solutions containing $H_2O$, $H_2SO_4$, and organic material consisting preponderantly of isobutene, the apparatus shown in the drawing and the method of operating the same are not limited in utility to this raw material. The method of distillation may be applied with advantage to the distillation generally of acid liquors, containing as equilibrium components $H_2O$, $H_2SO_4$, and olefines, and this method (particularly when combined with the application of vacuum) is generally valuable in increasing the yield of alcohols from any particular batch of acid liquor. The application of vacuum, either alone or in combination with the specific method hereinbefore described, is likewise of value in increasing the yield of alcohols from any particular batch of said liquor. In many cases, I find it of additional advantage to pass the diluted acid liquor through a preliminary heater such as 50. This may be accomplished by manipulating valves 51 and 52 to divert the incoming material through pipe 53 into the preliminary heater 50.

In this heater the diluted acid liquor is warmed by the passage of a heating medium through pipe 54 into heater coil 55. The degree of heat to be applied and the capacity of the preliminary heater 50 may be determined in advance for any particular raw material by preliminary experiments to determine the optimum time and temperature for maximum hydrolysis of the alkyl sulphates present. This time temperature relationship will vary for particular materials and cannot therefore be generally defined. When distilling acid liquors in which the organic component is preponderantly isobutene, the rate of hydrolysis is relatively rapid and the use of a preliminary heater such as 50 is not imperative, although it may be applied. In a vast majority of cases however, the preliminary heater is of value, inasmuch as it permits me to separate the distillation into two stages, viz, a stage of hydrolysis, and a stage of combined distillation and rectification. The hydrolysis takes place in the preliminary heater 50 and the distillation in column 9, and by separating the operation into two stages as aforesaid, each may be carried out independently of the other with a substantial increase in operating efficiency. It is my intention that the invention be limited only by the appended claims or their equivalents in which I have endeavored to claim broadly all inherent novelty.

I claim:

1. Process of producing alcohol from a liquid phase including as equilibrium components water, sulfuric acid, and olefine material, which comprises maintaining a body of said liquid phase of substantially constant volume, continuously partially distilling said maintained body thereby producing a vapor phase containing alcohol, immediately rectifying such vapor phase, withdrawing from an intermediate point of the rectifying zone an aqueous alcoholic product, continuously adding liquid phase material to said maintained body, and continuously removing from said maintained body any excess of liquid over that necessary to maintain said volume.

2. Process according to claim 1, conducted under subatmospheric pressure.

3. Process according to claim 1, in which the vapor phase produced in said maintained body is rectified to separate therefrom olefine material and as a separate cut and alcohol water mixture.

4. Process of producing alcohol from an acid reaction mixture formed by the reaction of sulfuric acid, water, and olefine material, which comprises heating the mixture to effect hydrolysis of the acid reaction products, then introducing the liquid into a distilling zone wherein it is heated to produce a vapor phase containing alcohol and a residue of liquid containing sulfuric acid.

5. Process according to claim 4, in which the mixture is continuously introduced into the heating stage and the heated liquid is continuously withdrawn to the distilling zone.

6. Process according to claim 4 in which the distillation is conducted under conditions to rectify the resulting vapor phase whereby an alcohol product of the desired boiling range is obtained.

7. In the rectification of alcoholic acid liquor for the production of alcohol therefrom, the improvement which comprises removing the aqueous alcoholic product as a side stream from the rectification zone, removing acid from the lower part of said zone, and removing gas from the upper part of said zone.

8. Process of producing tertiary butyl alcohol, comprising segregating an acid liquor consisting essentially of water, acid, and tertiary butyl alcohol, passing said mixture into the lower portion of a rectification zone, rectifying the mixture therein, removing from an intermediate portion of the zone aqueous tertiary butyl alcohol, and removing from the upper portion of the zone isobutene generated during the rectification.

9. Process according to claim 8, in which the rectification is conducted under sub-atmospheric pressure and the isobutene withdrawn is compressed and cooled.

10. Process according to claim 8, in which the quantity of water in the acid liquor is at least 65 parts by weight for every 35 parts by weight of acid, whereby the production of di-isobutene is substantially eliminated.

11. A process for the production of tertiary butyl alcohol, comprising distilling a mixture of tertiary butyl alcohol, water and sulfuric acid in which the weight ratio of water and acid is at least one to one, rectifying the resulting vapors and separating therefrom the aqueous tertiary butyl alcohol which is then stripped to remove traces of isobutene.

12. Process according to claim 11, in which the mixture is hydrolyzed and preheated to substantially the same temperature as that prevailing in the rectification stage at the point of introduction, before it is introduced into that stage.

BENJAMIN T. BROOKS.